United States Patent [19]
Kanakubo et al.

[11] Patent Number: 5,902,443
[45] Date of Patent: May 11, 1999

[54] METHOD FOR BONDING WITH CYANOACRYLATE ADHESIVE

[75] Inventors: Masaru Kanakubo, Gahanna; Takashi Horie; Makoto Watanabe, both of Dublin, all of Ohio

[73] Assignee: Toagosei America, Inc., West Jefferson, Ohio

[21] Appl. No.: 08/962,822

[22] Filed: Nov. 3, 1997

Related U.S. Application Data

[60] Provisional application No. 60/034,857, Jan. 28, 1997.

[51] Int. Cl.$^6$ .......................................................... C09J 5/00
[52] U.S. Cl. ........................ 156/305; 156/241; 156/295; 156/310; 156/323; 428/411.1; 526/298
[58] Field of Search ................................ 156/305, 331.2, 156/295, 310, 241, 323; 526/298; 428/411.1

[56] References Cited

U.S. PATENT DOCUMENTS

| | | |
|---|---|---|
| 4,215,173 | 7/1980 | Hubbard . |
| 4,687,827 | 8/1987 | Russo . |
| 4,702,783 | 10/1987 | Mason ..................................... 156/305 |
| 4,836,879 | 6/1989 | Edwards ................................. 156/295 |
| 5,006,410 | 4/1991 | Vogel Viola et al. ............... 428/411.1 |
| 5,262,200 | 11/1993 | Puder et al. . |

FOREIGN PATENT DOCUMENTS

| | | | |
|---|---|---|---|
| 57-51487 | 3/1982 | Japan ..................................... 156/241 |

*Primary Examiner*—John J. Gallagher
*Attorney, Agent, or Firm*—G. P. Maskas

[57] ABSTRACT

There is disclosed a method for accelerating the cure of cyanoacrylate adhesive by contacting the adhesive with a coating of an accelerator on a tape or sheet. Preferred embodiments relate to bonding a fabric to a substrate by placing a fabric in pressure contact with a substrate, said fabric having cyanoacrylate adhesive on one side thereof and openings of sufficient size between adjacent fibers to permit cyanoacrylate adhesive to pass through to the opposite side of the fabric and then contacting adhesive on the side away from the substrate with a polymerization accelerator coated on a backing. There is also disclosed a backing material such as a tape or sheet having a polymerization accelerator for cyanoacrylate adhesive coated on one side thereof, preferably, wherein the backing material does not bond to the cyanoacrylate on the side carrying the coating. Use of the method and backing material is particularly described for use in the manufacture of serigraphic screens.

21 Claims, No Drawings

METHOD FOR BONDING WITH CYANOACRYLATE ADHESIVE

This application is entitled to priority under 35 U.S.C. 119 (e) due to provisional application Ser. No. 60/034,857 which was filed on Jan. 28, 1997.

FIELD OF THE INVENTION

This invention relates to a method for accelerating the cure of cyanoacrylate adhesive by contacting the adhesive with a tape or sheet having a coating of cyanoacrylate accelerator. Various embodiments of the invention include bonding a fabric to a substrate. In a preferred embodiment, this invention relates to such method wherein the fabric is placed over the substrate to be bonded, a cyanoacrylate adhesive is placed over a portion of the fabric which overlies the substrate and an accelerating agent (also referred to as an activating agent, polymerization accelerator, or catalyst), coated on at least one side of a backing is pressed against the adhesive. This invention is particularly useful for bonding screen fabric to a frame structure for use in serigraphic printing.

BACKGROUND

Cyanoacrylate adhesives are useful in a wide array of industrial and domestic applications. In order to accelerate the cure of the cyanoacrylate adhesive, a polymerization accelerator such as an aromatic amine, is applied to the surface of the cyanoacrylate. Such use is common for the attachment of a screen fabric to a frame in the serigraphic (silk screen) printing industry. The screen fabric is stretched and placed in taut and touching communication with the peripheral surface of a rigid frame structure. The frame structure, although generally flat or planar in configuration, can also be curvilinear or cylindrical in cross section. The cyanoacrylate adhesive is applied over the screen fabric portions in communication with the frame structure to contact the adhesive with the frame through the mesh of the screen fabric. Alternatively, the adhesive can be applied directly to the frame area which comes in contact with the screen fabric. The adhesive is generally applied as a bead by the use of a plastic squeeze bottle having a small opening in a dispensing nozzle and is then spread out such as with a spatula, a card or other suitable flat, generally flexible implement. This flattens out the adhesive bead over the surface of the screen, assists in pressing adhesive through the mesh of the screen and provides proper contact of the adhesive with all portions of the screen in contact with the frame. In the case of large openings between adjacent fibers or low adhesive viscosity, the adhesive does not require pressing to pass through the openings of the fabric.

Various techniques are described in the prior art for contacting the cyanoacrylate adhesive with a polymerization accelerator.

U.S. Pat. No. 4,702,783 of Oct. 27, 1987 to W. H. Mason sprays a polymerization accelerator on the cyanoacrylate such as with an aerosol propellant. In spraying the accelerator, accelerator particles contaminate the work place and when an aerosol is used in the spray, volatile organic contaminants are placed in the atmosphere. Additionally, spraying techniques and use of aerosol is wasteful of accelerator. Furthermore, after the adhesive is cured, it has a rough surface.

U.S. Pat. No. 5,262,200 of Nov. 16, 1993 to A. Puder accelerates the cure of cyanoacrylate adhesive in uses such as that of the above mentioned U.S. Pat. No. 4,702,783 patent. However, instead of contacting the adhesive with the accelerator, the method of this U.S. Pat. No. 5,262,200 patent contacts the screen which in turn is in contact with the frame with an absorbent wicking material that is permeated with accelerator solution. The cyanoacrylate is subsequently applied over the screen which has been previously contacted with the accelerator. The applicator used for applying the accelerator is similar to a felt tip pen marker. This method is time consuming, requires the use of wicking material together with a holder and leaves a relatively rough surface on the adhesive. Furthermore, application of the accelerator is to the silk screen over the frame and not directly to the adhesive. This process is not as effective as applying the accelerator over the surface of the adhesive which overlies both the frame and screen.

U.S. Pat. No. 4,215,173 of Jul. 29,1980 to D. Hubbard discloses a method for bonding substrates of porous materials such as wood with cyanoacrylate by applying to the porous material a chalkable solid polymerization accelerator of a basic reacting solid material, such as sodium hydroxide, and then applying a coating of cyanoacrylate to at least one of the bonding surfaces before pressing the bonding surfaces together. The method disclosed in the U.S. Pat. No. 4,215,173 patent is time consuming since the chalkable material needs to be uniformly applied over the bondable surfaces. Furthermore, it is limited to the application of solid accelerator chalkable materials by rubbing over the surface of the wood or other porous material.

U.S. Pat. No. 4,687,827 of Aug. 18, 1987 to L. Russo. Russo does not contact a cyanoacrylate adhesive with polymerization accelerator and is simply concerned with preventing a low viscosity cyanoacrylate from bonding brush bristles in a bottle containing cyanoacrylate. Russo pre-wets brush bristles with an anhydrous solvent, such as acetonitrile, which can then be placed in a bottle of cyanoacrylate adhesive so that the adhesive does not bond to the bristles.

SUMMARY OF THE INVENTION

In one aspect, this invention relates to a method for curing cyanoacrylate adhesive by contacting the adhesive with cyaoacrylate accelerator which has been coated on a tape or sheet.

In another aspect, this invention relates to a method for bonding a fabric to a substrate by placing the fabric in pressure contact with a substrate, said fabric having cyanoacrylate adhesive on one side thereof and openings of sufficient size between adjacent fibers to permit cyanoacrylate adhesive to pass therethrough to the opposite side of the fabric; and then contacting adhesive on the side of the fabric away from the frame with a polymerization accelerator coated on a backing.

In a further aspect, this invention relates to applying cyanoacrylate adhesive over the surface of a frame structure opening; placing one side of mesh screen fabric material in essentially taut and touching communication over the adhesive on the frame structure with said adhesive being squeezed through mesh openings of the screen fabric to the opposite side; and contacting an accelerator for cyanoacrylate polymerization which is coated on a backing with the adhesive on said opposite side.

In yet another aspect, this invention relates to bonding a screen fabric to a frame structure for serigraphic printing use by providing a screen fabric material in essentially taut and touching communication with the peripheral surface of a frame structure; applying a cyanoacrylate adhesive to the screen fabric portions in communication with the frame structure to contact the adhesive with the frame structure through the mesh of the screen fabric; and contacting the adhesive a cyanoacrylate polymerization accelerator coated on at least one side of the tape.

In still another aspect, this invention relates to a tape or sheet coated with an polymerization accelerator of cyanoacrylate adhesive wherein the tape or sheet on the side of the coating is resistant to bonding with the adhesive.

In still a further aspect, this invention relates to the methods and backings described above wherein the coating on the backing is a mixture of accelerator and release agent for cyanoacrylate adhesive or the coating comprises a material which has both accelerator and release properties.

DETAILED DESCRIPTION

Applicants have found that the use of a coating of polymerization accelerator on at least one side of a backing material, particularly a flexible sheet or tape, solves many of the problems encountered in the prior art for accelerating the cure of a cyanoacrylate adhesive.

Advantages of this invention include the following: the polymerization and curing is performed with little or no loss of accelerators; accelerator together with volatile components are not sprayed into the atmosphere; expensive equipment is not required; the carrier, i.e., a backing material such as a tape or sheet, for the accelerator can be of inexpensive material such as paper or plastic film; and since only small quantities of accelerator are needed, the coating provides an effective way of providing such small quantities and also serves to meter the amount of accelerator applied to the cyanoacrylate so that excessive amounts of accelerator are not used.

Additional advantages are as follows fumes emitted in spreading the adhesive after application are better controlled by this invention as compared to other methods; containers, such as aerosol cans commonly used for spraying cyanoacrylate accelerator, are not required in this invention and consequently do not produce an environmental disposal problem; the steps required to perform the method are few in number and permit rapid assembly of adhesively secured surfaces; when backings are pressed with a planar article or roller to squeeze and spread the adhesive, the cured adhesive can have a flat and smooth surface as compared to some other methods of applying the adhesive and accelerator. In the prior art of serigraphic printing, the adhesive is generally contacted directly with a spatula to spread and apply it. The spatula eventually requires disposal or cleaning whereas in the instant invention, when a spatula is used, the spatula can be used to contact and spread the adhesive before the backing is placed over the adhesive and/or the spatula can contact the backing material to spread or assist in spreading of the adhesive. When the spatula is used over the backing, less adhesive is deposited on the spatula.

The method of this invention can be used in diverse applications, including that of adhering a fabric to a substrate, e.g. a structure such as that of wood, metal, rubber or plastic, or to a rigid wall and particularly for attaching screen fabric to frames for use in the serigraphic printing industry. The substrate to which the fabric is attached as well as the accelerator backing preferably resist penetration by the adhesive or accelerator. Illustrative of materials which are normally not penetrated by the adhesive or accelerator there can be mentioned wood, metals, plastics, and the like.

By the term fabric is meant cloth, metal, e.g. wire, or plastic, having meshlike openings or interstices passing from one plane to the other. By the term screen fabric we mean fabric used for screening.

In one embodiment of the method of the instant invention, cyanoacrylate adhesive, normally in the form of a bead or parallel beads is squeezed out of a squeeze bottle and placed on the fabric overlying the substrate to which it is to be attached. The adhesive is then spread with a spatula so as to overlie the substrate. A backing material, such as one having a planar surface, e. g. a tape or sheet carrying the polymerization accelerator coating, is contacted, e.g. pressed, against the adhesive on the fabric. When tape is used it is preferably dispensed from a roll carried by a conventional hand-held dispenser having a serrated cutting edge mounted thereon such as is used for dispensing pressure sensitive adhesive tape. Pressing the tape against the adhesive further squeezes and spreads the adhesive over the surface of the fabric in contact with the substrate and aids in having adhesive pass through the meshlike openings of the fabric to contact the substrate. When a fabric has small openings between its fibers or threads which are difficult to penetrate by the cyanoacrylate adhesive, pressing the adhesive against the fabric forces adhesive through small openings of the fabric and into more intimate contact with the underlying substrate. However, in some instances, the mesh openings, can be sufficiently large so that the adhesive flows through the openings to provide communication with both the mesh screen fabric and the frame structure without applying additional pressure. By the term "communication" we mean contact. Contact of the accelerator with the surface of adhesive can polymerize a mass of such adhesive such as that which overlies a screen, passes through mesh openings and in turn contacts the substrate.

In another embodiment of this invention, the substrate, such as frame members used to carry a screen for serigraphic printing, has cyanoacrylate adhesive applied on peripheral surfaces. A meshed screen fabric is then contacted with the adhesive by having the fabric press against the adhesive in stretching the fabric. This causes the adhesive to be passed through the mesh openings to the opposite side of the fabric so that there is adhesive contact between the frame and fabric with adhesive on the opposite side of the fabric, i.e., the side away from the frame. A polymerization accelerator coated on a backing is then placed in contact with the said opposite side of the fabric to polymerize the adhesive.

Only a small amount of accelerator is required for accelerating the polymerization of the adhesive. The use of a coating on a tape or sheet provides precise control of the amount of accelerator. After curing (polymerizing) the cyanoacrylate, the backing which carried the accelerator can be immediately removed such as in the case when the backing does not adhere to the cyanoacrylate. Alternatively, the backing can be left over the fabric when it adheres to the cyanoacrylate and then removed in a subsequent step such as a after printing with the screen.

Heat is sometimes developed in curing the cyanoacrylate with the accelerator on the backing material. At times, when thick sections of adhesive are contacted with the accelerator, some of the plastic backing materials such as four gage conventional polyethylene will soften deform and even melt and cause localized binding of the backing to the screen. This can be minimized or overcome by use of thicker gage backing material or different backing material such as by the use of metal or plastic having a higher melting point or the use of a release agent for cyanoacrylate adhesive. Such deformation and binding can also be minimized or overcome by use of a less active cyanoacrylate, less active accelerator, lower concentration of accelerator in the coating of the backing and preferably by use of a coating having both accelerator and release properties.

For serigraphic printing use, it is preferred that the backing material which carries the accelerator and the spatula for spreading the adhesive bead have a width which is at least equal and preferably wider than the width of the frame members to which the screen fabric is to be applied. Illustratively, for a frame which is 3 inches (7.62 cm) wide, it is preferred that each of the tape and spatula be about 4 inches (10.16 cm) wide.

A preferred process of this invention for bonding a screen to a frame for use in serigraphic printing comprises the following steps: (a) Secure the screen on the frame overlying the frame opening and then apply cyanoacrylate adhesive to the screen overlying one of the frame members. (b) Spread the adhesive on the fabric overlying the frame member with a device such as a spatula and to squeeze adhesive into the screen mesh openings for contact with the frame member (c) Place the side of an accelerator coated flexible tape on the glue-coated screen overlying the frame member beginning at one corner of the frame member and then, progressively, place it over the entire glue-coated area of the screen overlying the frame member being treated, particularly while pressing the tape with a device such as a spatula or roller to further squeeze glue into the screen mesh openings for contact with the frame member and to flatten the glue over the surface of the screen overlying the frame member. A preferred mode for dispensing and applying the tape is by the use of a roll of tape carried by a conventional hand-held dispenser such as that used for dispensing pressure sensitive adhesive tape which permits the roll to rotate as the tape is unwound and has a serrated cutting edge for severing the film at the desired lengths. However, in using such dispenser, care needs to be exercised in preventing the serrated cutting edge from contacting the stretched fabric. (d) The above procedure is repeated for each of the other frame members of the frame structure underlying the adhesive. (e) In seconds or minutes, depending on variables such as the speed of the cure of the adhesive, the adhesive is solidified and cured.

The fabric has openings such as mesh openings and other interstices therein of sufficient size for cyanoacrylate adhesive to pass through the pores or openings so as to contact both the fabric and Substrate which is to be adhered. Suitable fabrics, e.g., screening material, can be made of fibers which are bondable by cyanoacrylate adhesive such as those of polyester, nylon, cotton, silk, metal, e.g. stainless steel and the like. The fabric, e.g. screen fabric can have fiber diameters of from about 0.0014 inches (0.0036 cm) or less to that of 0.88 inches (2.24 cm) or more with openings therebetween of 0.0017 inches (0.0043 cm) or less to 0.312 inches (0.79 cm) or more. Preferably, the screen fabric material is that having about 50 to 325 meshes per linear inch (2.54 cm), i.e. from about U.S. Sieve Series 50 to 325.

The backing material can be rigid or flexible such as a web or membrane, e.g., tape or sheet. The backing provides a continuous surface which carries the accelerator coating and can have one or both surfaces coated with the accelerator. The backing material can be that of a variety of materials such as plastic, metal or cellulose but preferably that of a flexible film such as conventional polyethylene or polypropylene, polybutylene having a thickness of about 4 mil (four thousandths of an inch). The side or sides of the backing material which carry the polymerization accelerator coating can or cannot be resistant to bonding with cyancacrylate.

Resistance to cyanoacrylate bonding, at room temperature, can be achieved by using a backing material which is itself resistant to such bonding, e.g. due to the chemical or physical properties of the backing. Illustrative of material which resist bonding with cyancacrylate there can be mentioned: polyethylene, polypropylene, polybutylene, and the like; polytertafluoroethylene and other fluorine containing polymers. When the backing material is not inherently resistant to bonding with cyanoacrylate, e.g., such as in the case of paper, polyvinyl chloride, metal foil and the like, or when greater resistance to bonding is desired than that provided by materials generally resistant to cyanoacrylate bonding, the side or sides of the backing material can be treated to prevent such bonding, e.g. coated with a mixture of release agent and polymerization accelerator such as a mixture of about 50 to 90 parts, preferably 55 to 80 parts, of release agent and 10 to 50 parts, preferably 20 to 45 parts, by weight, of accelerator. Also, a single compound having both accelerator and release properties such as an amino substituted silicone oil can be used.

The release agent for cyanoacrylate adhesive is a material which inhibits or prevents cyanoacrylate adhesive from sticking to material with which it is placed in contact, e.g. the tape carrying the accelerator. Illustrative of release agents there can be mentioned: (a) fatty acid esters such as the ethylene glycol ester of a fatty acid, the sorbitol ester of a fatty acid and the polyoxyethylene ester of a fatty acid; (b) various alcohols such as polyoxyalkylene glycol; glycol derivatives; and polyoxyethylene higher alcohol ethers; (c) phosphoric esters such as polyoxyalkylene ester of phosphoric acid; (d) metallic soaps such as calcium stearate and sodium oleate; (e) silicone oils such as dimethylsilicone oil and amino substituted silicone oil; and (f) fluorocarbons such as polytetrafluoroethylene and polychlorotrifluoroethylene. The release agents can be solids or liquids although liquids are preferred. Amino substituted silicone oils have both release and accelerator properties. A preferred release agent is silicone oil.

The use of a coating on the backing material having a mixture of release agent and accelerator or a single compound which has both accelerator and release agent properties facilitates the removal, such as peeling off of a polyethylene tape, from the cured adhesive. Even with the use of backings such as polyethylene which normally resist permanent sticking to cyanoacrylate during its curing, the conditions of cure such as development of high temperatures cause portions of the backing a material to become embedded or to permanently stick to the cured adhesive. This problem is greatly diminished or eliminated by using a coating having both accelerator and release properties. Simply placing a coating of release agent on the backing and then placing a coating of accelerator over the release agent is not as effective in facilitating the smooth removal of the backing from the adhesive after curing as compared to having a coating wherein the layer contacting the adhesive has both accelerator and release properties.

The use of backing material or coatings on such backing material which resist cyanoacrylate bonding are not necessary for the practice of this invention since the adhesively bonded backing material can often be left on the material to which the screen is adhered, e.g., a screen for use in serigraphic printing.

Conventional cyanoacrylate adhesives can be used in this invention. Cyanoacrylate adhesives are particularly suitable for serigraphic printing use since such adhesives have a high shear strength and low peel strength. Thus, when adhered with cyanoacrylate, screen fabric can be tensioned to attain a taut surface without failure of the adhesive but the adhesive together with the screen fabric can subsequently easily be peeled off of the frame. The cyanoacrylate adhesives are monomeric alpha-cyanoacrylate esters, e.g., ethyl 2-cyanoacrylate otherwise also simply referred to as ethyl cyanoacrylate. Illustrative of cyanoacrylate adhesives there can be mentioned those of: methyl 2-cyanoacrylate; ethyl 2-cyanoacrylate; n-propyl 2-cyanoacrylate; isopropyl 2-cyanoacrylate; n-butyl 2-cyanoacrylate; isobutyl 2-cyanoacrylate; 2-ethylhexyl 2-cyanoacrylate; cyclohexyl 2-cyanoacrylate; phenyl 2-cyanoacrylate; tetrahydrofurfuryl 2-cyanoacrylate; methoxyethyl 2-cyanoacrylate; allyl 2-cyanoacrylate; 2-ethoxyethyl 2-cyanoacrylate; 3-methoxybutyl 2-cyanoacrylate; and the like. Both single monomers and mixture of monomers can be used The viscosity of the cyanoacrylate adhesive can vary over a wide range such as that of about 1 to about 50,000 cps (centipoise), preferably 50 to 2,000 cps, of the liquid type or 5,000 up to about 1,000,000 of the gel type. One of the methods for controlling the viscosity of the cyanoacrylate adhesive is by the addition of a suitable thickeners such as simple polyacrylates, or poly(methyl methacrylate), cellulose acetate, and the like. In addition to the thickeners for viscosity control, the cyanoacrylate adhesive can contain conventional additives for cyanoacrylate adhesives such as: stabilizers, e.g. hydroquinone and sulfur dioxide; polymerization-accelerators such as polyalkylene oxide and its derivatives; crown ether and its derivatives; calixarene derivatives; dyes; pigments; plasticizers; and the like.

The rate of polymerization of the cyanoacrylate adhesive can be controlled by conventional means such as the accelerator used, the cyanoacrylate used, the concentration of the accelerator in the coating, and the like.

Only a small quantity of accelerator is needed to accelerate the polymerization of a substantially greater quantity of adhesive. Furthermore, all parts of the adhesive need not be contacted with accelerator for the acceleration of the cure or polymerization. Thus, contacting the surface of an adhesive layer with small amount of accelerator is sufficient to cure the adhesive layer. The quantity of accelerator can be that such is found on a backing by spraying accelerator on to a polymeric film in an amount sufficient to merely wet the surface of the film or by passing a polyethylene tape through a tank containing the accelerator and subsequently winding the tape into a roll.

Illustrative of suitable accelerators for the cyanoacrylate adhesive there can be mentioned: amines such as aniline, N,N-dimethylaniline, N,N-dimethyl-p-toluidine, N,N-diisopropyl-p-toluidine, choline chloride, and guanidine, and basic materials such as caustic soda and sodium carbonate. The preferred accelerators are liquid aromatic amines. The accelerator can be one compound or a mixture of accelerator compounds.

The accelerator as well as other ingredients comprising the coating on the backing are referred to herein as a coating even though such coating may be in the form of discrete particles such as small atomized particles which do not form a continuous coating.

The accelerator or accelerator and release material coated backing can be prepared by conventional means for depositing a coating on a backing. The release material can be used when the backing normally adheres to the adhesive or when due to its physical or chemical properties the backing is resistant to bonding but greater resistance to bonding is desired. The backing with or without a release agent on the side which is to carry the polymerization accelerator, with or without a release agent, is then coated on the backing material such as by: brushing; spraying; dipping; or use of conventional printing techniques. If the accelerator is a solid it can be dissolved in a solvent before coating on to the backing material and then dried so as to evaporate the solvent. Conventional solvents for the accelerator can be used. If the accelerator is a liquid, it can be diluted with a solvent or used in its undiluted form. The backing material, such as a web of flexible tape or sheet, is normally slit and wound on a tubular core to provide a roll such as that having a width somewhat greater than the substrate to be adhered. In case the accelerator is a liquid, one can generally feel the coating of liquid on the surface of the backing material. Accelerators which are normally in the liquid state, such as dimethyl-p-toluidine, are advantageous since they can get into interstices of the fabric which contain adhesive and cure the adhesive which would normally not be in contact with solid accelerator on a backing by pressing the backing on the face of the fabric.

To be assured that all of the accelerator coating on the backing material has been applied to the adhesive, it is desirable that the backing material be transparent and that the accelerator be colored with a dye or pigment. This will permit visual inspection to determine when the coating has been transferred from the backing material to the adhesive.

The following examples are illustrative of the invention. In the examples as well as elsewhere in this application, parts and percentages are by weight unless otherwise specified.

EXAMPLE 1

This example shows the preparation of a backing having an accelerator coated on one or both sides of the backing. A roll on which is wound a web of flexible polyethylene film having a thickness of about 4 thousandths of an inch (4 mil) is continuously unwound and coated on one side thereof with dimethyl-p-toluidine as the accelerator. The coating is applied with conventional printing equipment such as that of a one side coater wherein a fountain roller picks up accelerator from a fountain and transfers it to one side of the film passing between the gap of the fountain roller and a roller above said fountain roller. This places a substantially uniform layer of accelerator on one side of the film. The web is then slit into the desired widths such as that of about three (7.62 cm) or four inches (10.16 cm) and wound on spools. In another method for coating of the accelerator backing material, the film is passed through a tank containing liquid accelerator so that both sides of the film are coated with polymerization accelerator. The speed of the film being coated in the tank is one foot (30.5 cm) per second.

EXAMPLE 2

Polyester serigraphic screen fabric was stretched over the opening of the four sides of a welded rectangular aluminum frame structure having sides (frame members) which had lengths of four feet (1.22 meters) and eight feet (2.41 meters) and wherein the sides had a cross section of four inches (10.16 cm). A bead of cyanoacrylate adhesive was applied over the screen fabric overlying one of the frame members. The bead was applied on to the screen about midway between the longitudinal sides of the substrate frame member. One end of a roll of four gage polyethylene tape was adhered with pressure sensitive adhesive to a stationary object in line with the frame member so that the tape would overlie the length of the frame member when unrolled. The tape had a width of about 4 inches (7.62 cm) and contained a coating of polymerization accelerator without release agent. The coating was on both sides of the tape. The accelerator was dimethyl-p-toluidine. The tape was then progressively unrolled and placed over the adhesive while being forced against the adhesive and underlying mesh with a spatula or a rubber roller so as to spread out the bead of adhesive, force it into the mesh openings and polymerize it. The adhesive quickly polymerized when in contact with the accelerator. This was continued until the adhesive bead of the entire screen material overlying the length of the frame member had been polymerized. The process was repeated with the remaining three sides of the frame members. On peeling off the tape over the adhesive, pieces of the tape broke off from the main body of tape, in places the adhesive had enveloped portions of the broken pieces of tape, and the adhesive, in places did not have a smooth surface. Most of the broken pieces of tape were removed from over the screen fabric before the screen was used in subsequent steps for the serigraphic printing. The screen material maintained adequate tension and was suitable for use in serigraphic printing.

EXAMPLE 3

Polyester serigraphic screen fabric is stretched over the opening of the four sides of a welded rectangular aluminum frame structure having sides (frame members) which have lengths of four feet (1.22 meters) and eight feet (2.41 meters) and wherein the sides have a cross section of four inches (10.16 cm). A bead of cyanoacrylate adhesive is applied over the screen fabric overlying one of the frame members. The bead is applied on to the screen about midway between the longitudinal sides of the substrate frame member. The bead is then spread on the screen overlying the frame member with a spatula. The coating of a five inch (12.7 cm)wide roll of tape of 4 mil polyethylene is then placed in contact with the adhesive by progressively unrolling the tape from a conventional hand held dispenser of the type used to dispense pressure sensitive tape. The coating on the tape comprises a mixture of 100 parts by weight of silicone oil as release agent and 50 parts of dimethyl-p-toluidine as the accelerator. The silicone oil is KF-393 of Shin-Etsu Silicones of America, Inc. which has an office at 1150 Damar Drive, Akron, Ohio 44305. The tape is also pressed over the adhesive with a spatula. The adhesive quickly polymerizes when in contact with the mixture of accelerator and release agent. This procedure is continued until the adhesive of the entire screen material overlying the length of the frame member is polymerized. After polymerization of the adhesive, the tape is easily peeled off from the adhesive without damage to the tape. A smooth surface is left on the adhesive. The process is repeated with the remaining three sides of the frame members.

Although this invention is particularly described for curing of cyanoacrylate adhesive for bonding a fabric to a substrate, it is not limited to use with fabrics. Thus, the use of a tape or sheet having an accelerator coated thereon is advantageous for accelerating the cure of cyanoacrylate when one or all articles to be bound are pervious, e.g., fabrics, or impervious, e.g. matals, to the cyanoacrylate adhesive. Illustratively, the use of a tape of sheet coated with accelerator, such as a mixture of accelerator and release agent as described hereinbefore, for contacting and accelerating the cure of cyanoacrylate can be used in applications when there is exposed cyanoacrylate at a glue joint such as in adhering the edge of a plate to the side of another plate, e.g., in making T joints.

The amino substituted silicone oils which can be used as accelerators are silicone oils wherein polyorganosiloxane side chains and/or end groups of the silicone oil contain organic amino substituents. Silicone oil is a polyorganosiloxane which is oily at ambient temperature. Polyorganosiloxane has the following chemical structure:

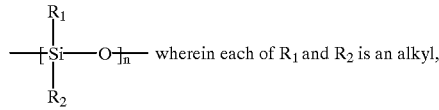

wherein each of $R_1$ and $R_2$ is an alkyl, phenyl, etc. group. When both $R_1$ and $R_2$ are methyl, the polymer is called polydimethylsiloxane. In the case of amino substituted silicone oils, amino groups are introduced into the polyorganosiloxane side chain and/or groups. Illustratively, Shin-Etsu Silicones of America, Inc. markets two types of amino substituted silicone oils. One of these, namely type 1, is also referred to as the side chain type which can be represented by the formula:

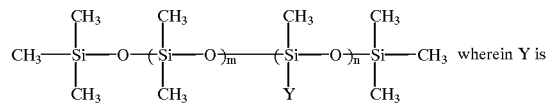

wherein Y is an organic amino groups such as $-RNH_2$, or $-R-NH-R'-NH_2$ and R and R' are probably alkylene groups. It can be seen that in the side chain type of polymer, some of the methyl groups are substituted with amino containing organic groups. The other type namely, type 2, is referred to as the dual end type which can be represented by the formula:

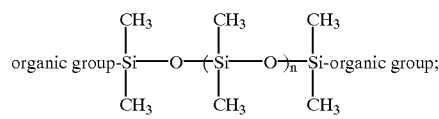

wherein the organic group is $-RNH_2$. It can be seen that the polymer has two organic groups at both ends of the polyorganosiloxane. The content of amino groups in the polymer are varied by chain length (m/n of type 1 or n of type 2). The amino substituted silicone oil used in Example 3 above, namely, KF-393, is of the type 1 polymer and its amino group equivalent is 360 g/mol.

What is claimed is:

1. A method for accelerating the cure of cyanoacrylate adhesive and bonding two substrates which comprises: contacting adjacent substrates with cyanoacrylate adhesive wherein the adhesive is in contact with both substrates and a peripheral portion of said adhesive is exposed, contacting a coating on a backing against said exposed adhesive, said coating exhibiting cyanoacrylate polymerization accelerator properties and cyanoacrylate adhesive release properties.

2. A method for bonding a fabric to a substrate, said method comprising:
   (a) placing a fabric in pressure contact with a substrate, said fabric having cyanoacrylate adhesive over one side thereof and openings of sufficient size between adjacent fibers to permit cyanoacrylate adhesive to pass therethrough to the opposite side of the fabric; and
   (b) contacting the adhesive on the side of the fabric away from the substrate with a polymerization accelerator coating on a backing wherein the coating comprises a mixture of a polymerization accelerator for cyanoacrylate adhesive and a release agent for cyanoacrylate adhesive.

3. The method of claim 2 wherein the substrate is a frame structure for serigraphic printing.

4. The method of claim 1 wherein the backing is a flexible film which softens and deforms during cure of the cyanoacrylate adhesive by a coating of dimethyl-p-toluidine on the film backing and upon curing of the adhesive, the backing is removed from contact with the cured cyanoacrylate.

5. The method of claim 1 wherein the coating contains an amino substituted silicone oil.

6. The method of claim 1 wherein the backing is a flexible sheet or tape selected from the group consisting of plastic, metal and cellulose.

7. A method for fastening a meshed screen fabric to a frame structure for serigraphic printing use, said method comprising:

(a) providing a meshed screen fabric material in essentially taut and touching communication over the peripheral surface of a frame structure opening;

(b) applying a cyanoacrylate adhesive over said screen fabric portions in communication with said frame structure to contact the adhesive with the frame structure through the mesh of the screen fabric; and (c) curing the adhesive by contacting the adhesive with a coating on a backing, said coating containing a polymerization accelerator for cyanoacrylate adhesive which exhibits cyanoacrylate adhesive release properties.

8. The method of claim 7 wherein the coating comprise from 50 to 90 parts of a release agent admixed with each 10 to 50 parts of accelerator by weight and, after polymerization of the adhesive, the backing is removed from the polymerized adhesive.

9. The method of claim 8 wherein the tape is that of polyethylene, the accelerator is an aromatic amine, and the release agent is a silicone oil.

10. The method of claim 8 wherein the coating is an aromatic amine in the liquid state.

11. The method of claim 8 wherein the backing comprises a flexible polymeric material.

12. The method of claim 8 wherein the backing is a flexible film of polyethylene, polypropylene, or polybutylene having a substantially uniform layer of accelerator on one side thereof wherein the polymerization accelerator is an amino substituted silicone oil.

13. A method for accelerating the cure of a cyanoacrylate adhesive and bonding two articles which comprises pressing an exposed mass of adhesive in contact with both a first and a second article, said pressing being effected with a coating on a flexible sheet or tape wherein said coating contacting the adhesive contains a mixture of a cyanoacrylate adhesive polymerization accelerator and cyanoacrylate adhesive release agent and wherein the sheet or tape is peeled off the adhesive after curing of the adhesive.

14. The method of claim 13 wherein the flexible sheet or tape provides: (a) a substantially uniform layer of accelerator coating on said sheet or tape; and (b) a continuous surface which carries the accelerator coating.

15. The method of claim 13 wherein the polymerization accelerator is an aromatic amine and the release agent is silicone oil.

16. The method of claim 13 wherein the flexible sheet or tape is a polymeric film.

17. The method of claim 16 wherein the polymeric film is a member selected from the group consisting of polyethylene, polypropylene and polybutylene.

18. A method for accelerating the cure of a cyanoacrylate adhesive and bonding two articles which comprises: pressing two articles together having cyanoacrylate adhesive between them to form an exposed glue joint of adhesive; and subsequently pressing a coated side of a sheet or tape against the exposed adhesive wherein the coating contains a mixture of a cyanoacrylate adhesive polymerization accelerator and a cyanoacrylate adhesive release agent.

19. The method of claim 18 wherein the coating contains a mixture of 50 to 90 parts of release agent and 10 to 50 parts, by weight, of accelerator and the sheet or tape is removed from the glue joint after polymerization of the adhesive.

20. The method of claim 18 wherein the articles are plates wherein the adhesive is on the side of one plate and the edge of another for making a T joint.

21. The method of claim 18 wherein the flexible sheet or tape is a polymeric film selected from the group consisting of polyethylene, polypropylene and polybutylene.

* * * * *